Patented Oct. 29, 1929

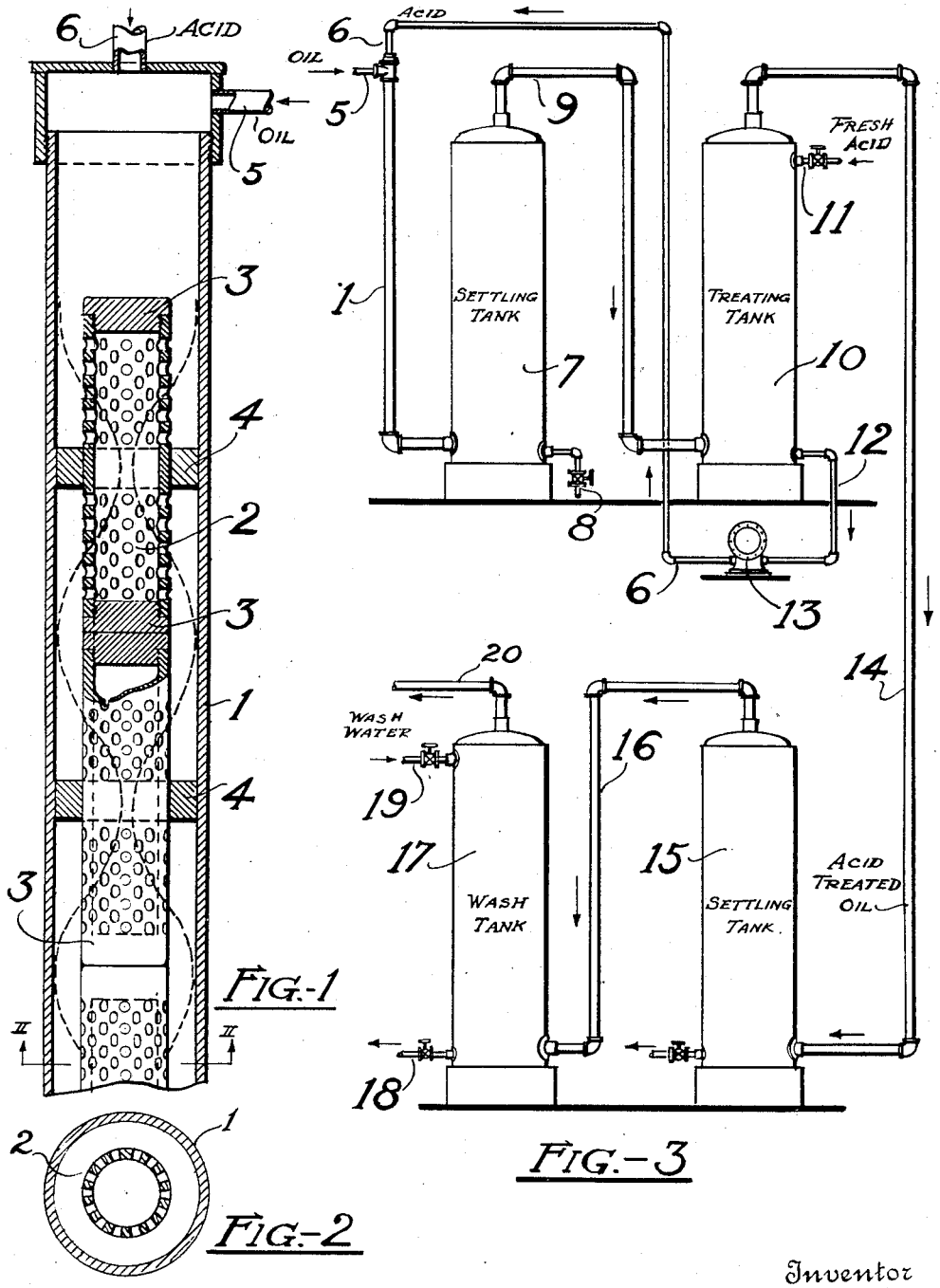

1,733,545

UNITED STATES PATENT OFFICE

CHARLES LEAVER, OF TORONTO, ONTARIO, CANADA

MIXING APPARATUS FOR OIL REFINING

Original application filed March 11, 1921, Serial No. 451,532. Divided and this application filed October 21, 1926. Serial No. 143,104.

The present invention relates to the refining of hydrocarbon oils, and particularly to apparatus for treating such oils with sulphuric acid. The invention will be fully understood from the following description, illustrated by the accompanying drawings, in which Fig. 1 is a fragmentary longitudinal section through an elongated mixer (mixing conduit or tube) constructed according to this invention.

Fig. 2 is a transverse section on the line II—II, Fig. 1; and

Fig. 3 is a diagrammatic side elevation of apparatus, including a mixing tube, for the acid-treating of oil.

Referring to Figs. 1 and 2, reference numeral 1 denotes a conduit within which are arranged a plurality of longitudinally alined pipe or tube sections 2. These sections are sealed at their ends by imperforate closures or caps 3, the caps of the adjacent pipe sections abutting against each other. Annular obstructions or rings 4 are arranged about midway of the sections and hold them in position. The rings 4 are machined to fit tightly in the conduit 1. The pipe sections are provided with numerous perforations on each side of the rings 4.

An oil inlet pipe 5 and an acid inlet pipe 6 open into the upper end of the conduit 1. Oil and acid entering the conduit follow the course indicated by the dotted lines in Fig. 1; that is, they are forced by the first of the rings 4 to enter the first pipe section 2 through the perforations therein, and are forced by the cap 3 at the end of the section to pass out into the annular space surrounding it. A similar arrangement and construction of the succeeding pipe sections causes the mixture of oil and acid to travel in a like manner through them, with the result that the liquids travel a zigzag path through the mixing tube, flowing into and out of the perforated pipe sections therein, and are very thoroughly intermixed.

The mixture of oil and acid passes out of the mixing tube 1 into a settling tank 7 (Figure 3), in which a separation of the acid sludge from the oil takes place. The sludge, which settles to the bottom, is drawn off through the valved pipe 8. The oil passes out of the settling tank through the pipe 9, which conveys it to the lower portion of a treating tank 10, containing means for securing intimate countercurrent contact between the oil and fresh acid introduced through pipe 11. The acid sludge collects in the bottom of the treating tank, from which it is withdrawn through pipe 12 by pump 13 and preferably forwarded through pipe 6 to the top of the mixing tube 1.

The acid-treated oil leaves the tank 10 through pipe 14, which conveys it to the settling tank 15. Thence the oil passes through pipe 16 into a wash tank 17. Bottom settlings from the tank 17 are drawn off through pipe 18. Wash water is supplied to tank 17 through a pipe 19. From the wash tank the oil passes through pipe 20 to other tanks, not shown, for further settling, alkali treating, and the like, if required.

Various changes and alternative arrangements may be made within the scope of the appended claims, in which it is my intention to claim all novelty inherent in the invention as broadly as the prior art permits.

This is a division of my copending patent application Serial No. 451,532, filed March 11, 1921.

I claim:

1. In oil refining apparatus, an elongated mixer, separate means for introducing oil and a treating agent thereto, a tube within said mixer and spaced therefrom to form a passageway between the mixer and tube, substantially complete obstructions arranged at intervals in said passageway, closures in said tube at points intermediate said obstructions, said tube having a large number of perforations forming the sole means of inlet thereto and outlet therefrom, whereby flow through the mixer is continuously alternated between the passageway and the tube.

2. In oil refining apparatus, a mixer comprising an elongated conduit, a plurality of foraminous tubular sections closed at both ends longitudinally mounted therein and spaced therefrom, partitions fitted within the conduit and surrounding the tubular sections, whereby continued flow is prevented except through the tubular sections, a tank, a plurality of pipes leading into one end of the conduit for the introduction of oil and treating liquid thereinto, and a pipe for withdrawing the mixed liquids from the other end of the conduit to the tank.

In testimony that I claim the foregoing as my invention, I affix my signature.

CHARLES LEAVER.